Nov. 12, 1963    V. BRAILOWSKY    3,110,675
METHOD OF FABRICATING FERRITE BODIES
Filed March 25, 1960    4 Sheets-Sheet 1

INVENTOR.
Vladimir Brailowsky
BY Robert E. Fowler
ATTORNEY

Nov. 12, 1963　　　　V. BRAILOWSKY　　　　3,110,675
METHOD OF FABRICATING FERRITE BODIES
Filed March 25, 1960　　　　　　　　　　　　4 Sheets-Sheet 3
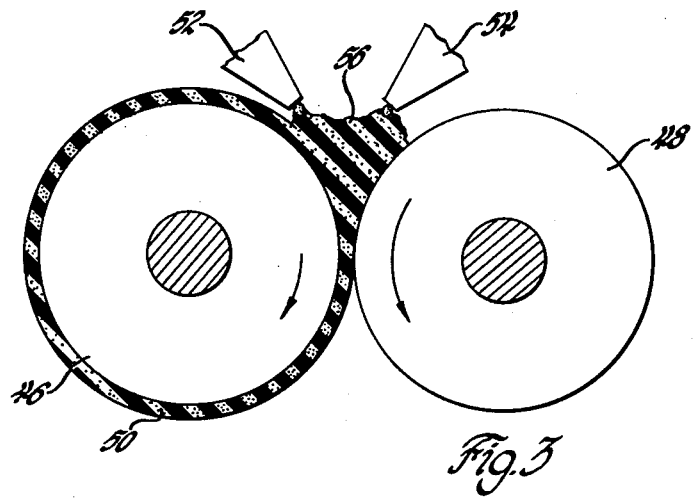
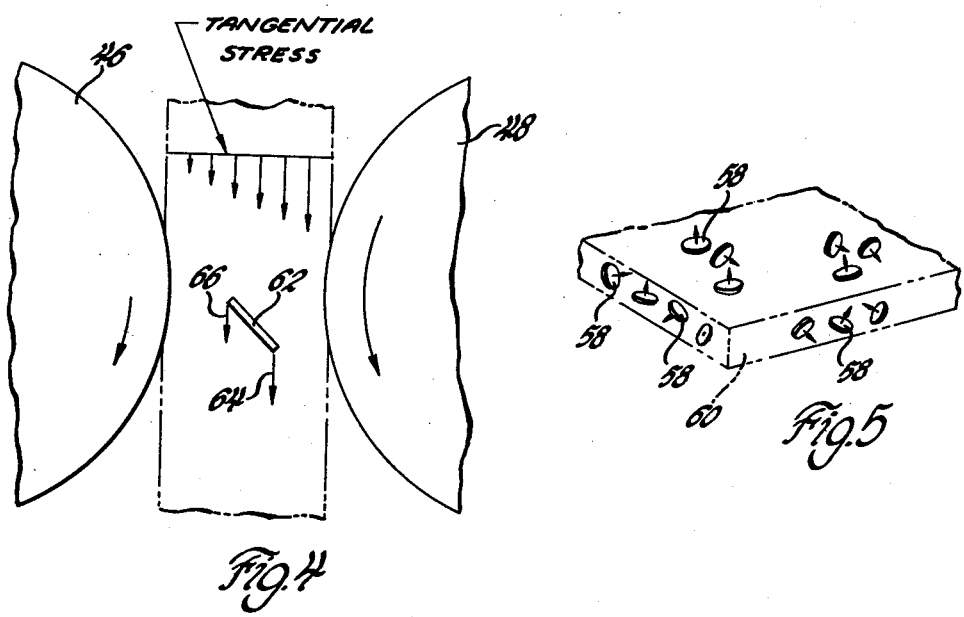
INVENTOR.
Vladimir Brailowsky
BY
Robert E. Fowler
ATTORNEY Nov. 12, 1963 V. BRAILOWSKY 3,110,675
METHOD OF FABRICATING FERRITE BODIES
Filed March 25, 1960 4 Sheets-Sheet 4 a — AFTER 1ST PASS SURFACE ONLY ORIENTED
b — AFTER 2ND PASS SURFACE & MIDPLANE ORIENTED
c — AFTER 3RD PASS SURFACE & THREE INTERIOR PLANES ORIENTED
d — FINAL PRODUCT ALL PLANES ORIENTED

INVENTOR.
Vladimir Brailowsky
BY Robert E. Fowler
ATTORNEY

United States Patent Office 3,110,675
Patented Nov. 12, 1963

3,110,675
METHOD OF FABRICATING FERRITE BODIES
Vladimir Brailowsky, Birmingham, Mich., assignor to General Motors Corporation, Detroit, Mich., a corporation of Delaware
Filed Mar. 25, 1960, Ser. No. 17,540
3 Claims. (Cl. 252—62.5)

This invention relates to a method of fabricating ferrite material or bodies made of such material and which is useful in the fabricating of either oriented or unoriented hard ferrite or soft ferrite bodies.

The fabricating of ferrite materials for use as cores or magnetic materials per se has in the past been tedious and expensive. Ferrite magnetic parts have been difficult to fabricate both from the standpoint of obtaining uniform material density so that the magnetic properties will be uniform and also so that the parts will have sufficient mechanical strength and not be easily destroyed, cracked or broken. Furthermore, in the methods previously used, expensive dies have been utilized which enjoy a relatively short life because of the extreme abrasive nature of metallic oxides.

It is an object in making the present invention to provide a simple, inexpensive and extremely satisfactory method of fabricating ferrite members.

It is a further object in making this invention to provide a method of fabricating ferrite members, which does not require expensive dies for obtaining the proper shapes.

It is a still further object in making this invention to provide a method of fabricating ferrite parts in which there is a maximum of uniformity in density in all portions of the part fabricated regardless of its shape.

With these and other objects in view which will become apparent as the specification proceeds, my invention will be best understood by reference to the following specification and claims and the illustrations in the accompanying drawings in which:

FIGURE 3 is a diagrammatic showing of how the ferrite materials are mixed into a temporary supporting means such as rubber compounds, vinyl, or thermal plastic materials by the use of rubber rolling mills, until the proper density and mixing has been obtained and orientation, if required, is also obtained;

FIGURE 4 is an enlarged diagrammatic showing of how the ferrite crystals are aligned in very thin sheets by the action of a rolling mill such as shown in FIGURE 3;

FIGURE 5 is an enlarged perspective view of a portion of the supporting sheet showing the unoriented ferrite crystals before alignment;

Figure 1:
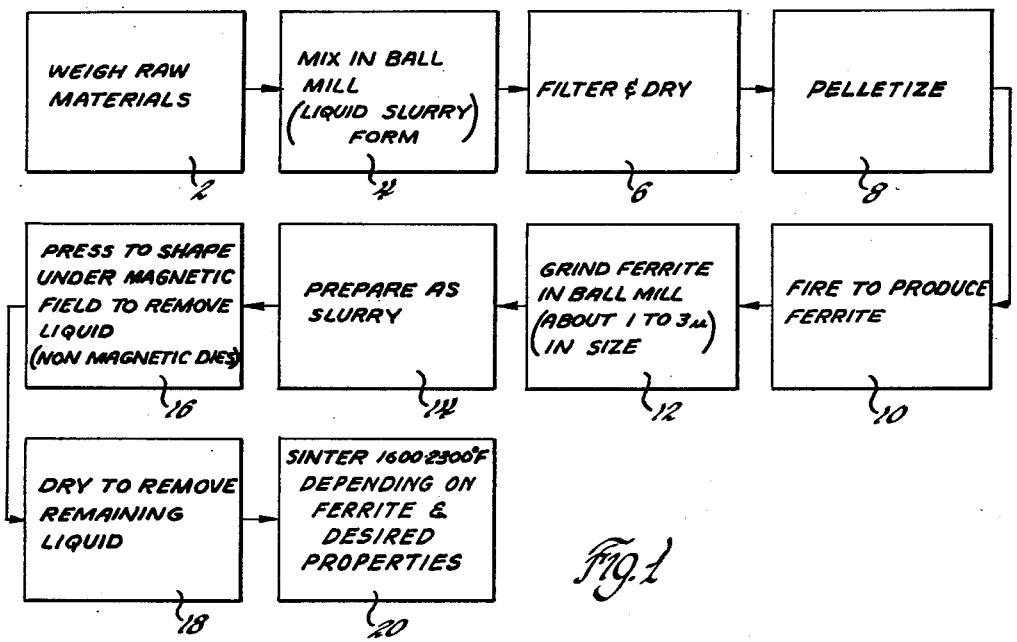
FIGURE 1 is a block diagram setting forth the various steps in a present typical method of obtaining hard oriented ferrite parts.

In one of the methods presently employed for fabricating hard oriented ferrite parts the proportions of the raw materials which include the required oxides such as iron oxide, barium oxide, etc. are first measured out as shown in FIGURE 1, square 2, and these oxides are then mixed with a sufficient amount of fluid and blended in a ball mill as a slurry shown in square 4. This slurry mixture is left in the ball mill for a very thorough mixing for a relatively long period of time. The slurry is then taken out and passed through a filter to remove most of the fluid. The mixed oxides are then dried in an oven as shown in square 6. The dried material is granulated into pellets as shown in square 8 and the pellets are fired at an elevated temperature to form ferrite crystals, square 10. The ferrite material is again ground in a ball mill until the desired particle size is obtained, about one to three microns for oriented materials, square 12. The ground ferrites are prepared as a slurry, square 14, and then pressed in a non-magnetic die to the desired shape under a strong magnetic field, square 16. During this process provision must be made to allow the excess liquid to be ejected. The pressed parts are then dried, square 18, and sintered at an elevated temperature, square 20. A description of this process may be found, for example, in "Ferroxdure, II and III, Anisotropic Permanent Magnetic Materials," by A. L. Stuijts, G. W. Rathenau and G. H. Weber which appeared in the Philips Technical Review, vol. 16, Nos. 5–6, pp. 141–180, November–December 1954.

It is well to point out that the material which is pressed into the desired shape FIGURE 1, square 16, is quite abrasive and a certain amount of die wear occurs. As noted above, it is necessary to apply a high intensity magnetic field during the pressing operation to align the ferrite crystals. This is a difficult problem because of the complex shape of some of the desired ferrite parts, which necessitates an equally complex shape of coil to produce a very high magnetic field at this juncture.

Pressing to shape is extremely complicated. Rather expensive and intricate dies are needed to meet the shape specifications as well as the requirement that the density be uniform. In press forging, for example, the material employed, a metal, is essentially incompressible, so density variations in the final product are not a problem. The die is merely contoured to represent the negative of the desired product. But in pressing the prepared raw materials for ferrites, the various sections of the die may move separately to maintain a constant density in the final product. The powder acts somewhat like a compressible gas, except that it can permanently support pressure or density gradients, i.e., in spite of all precautions exercised in preparation it does not "flow" ideally. Corners, for example, could crack after final sintering as a result of non-uniform density. This also produces a non-uniform magnetic field when the part is placed in an apparatus. Therefore, the present system is open to the following objections: (1) pressed parts are easily broken before firing; (2) non-uniform material density in the parts; (3) excessive wear on expensive dies in forming; (4) requires the use of unusual shapes of magnetizing windings in oriented parts; and (5) requires a long time to fabricate.

It will be seen that each and every one of the objections listed above adds to the expense of obtaining a satisfactory part and are the reasons why ferrite parts are currently expensive items.

Figure 1A:
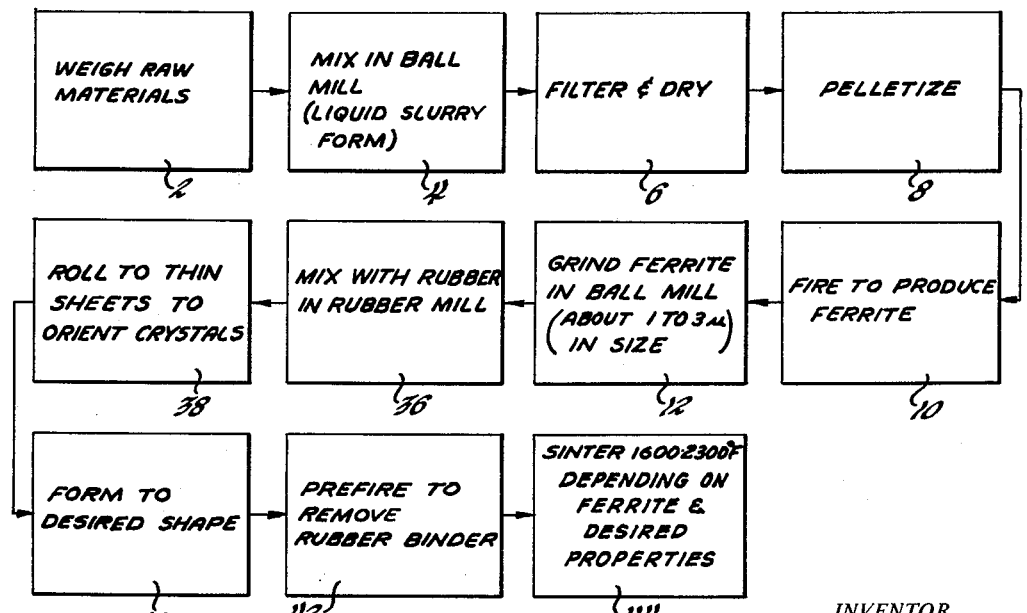
FIGURE 1a is a block diagram setting out the various steps in an improved method of making hard oriented ferrite parts incorporating my invention.

The new method devised by me overcomes most of the objections raised above and may be generally described by reference to the block diagram in FIGURE 1a. The steps shown in squares 2 through 12 are identical to those as shown in FIGURE 1. The resulting ferirte crystals from square 12, FIGURE 1a, are as before on the order 1 to 3 microns in size. It is desired to take these ferrite crystals and fabricate desired shapes of proper density and in order to do so it is proposed to place them in some type of transfer sheet to hold them in desired density and oriented for bulk supply. From these sheets the desired shapes can easily be cut. While various materials can be used, rubber is excellent for this purpose and since rubber mills exist commercially for mixing and rolling thin sheets, this equipment forms an excellent means for carrying out my process. One of the most difficult problems overcome by the rubber industry is the uniform mixing of plasticizers, coloring matter, etc., and this equipment provides an excellent means for producing the uniform mixing of ferrite materials and hence the density desired.

It is proposed to mix the ferrite materials with rubber in a rubber mill and roll the same out into thin sheets as shown in squares 36 and 38, FIGURE 1a. The rubber sheet holds the ferrite crystals mechanically in place. These thin sheets bearing the ferrite crystals, which are roughly of small flake shape, are continually re-rolled to orient the ferrite crystals until some proportion of the crystals lie in parallel planes if it is desired to have the end result oriented ferrite. In the event that the final thin sheets with oriented ferrite crystals do not provide a sufficiently thick form then the sheets may be stacked one on top of the other until the desired thickness is obtained. They can be bonded together by applying moderate pressures, say 2000 lbs. per square inch. At this point the material is a soft, rubbery material which can be easily, mechanically deformed or cut, has the desirable density and is now ready to be cut into any desired form with inexpensive dies as shown in square 40. When the parts are so cut they are then placed in an oven or furnace and prefired as shown in square 42, which removes rubber binder leaving a ferrite part with the various crystals oriented without the necessity of applying any magnetic field thereto during formation. Lastly, the prefired part is then placed in a further oven or the temperature raised in the same oven to sinter the ferrite part for the last step as shown in square 44, FIGURE 1a. Of course, after the final sintering a magnetizing field has to be applied to convert it into a permanent magnet if so desired.

Figure 2:
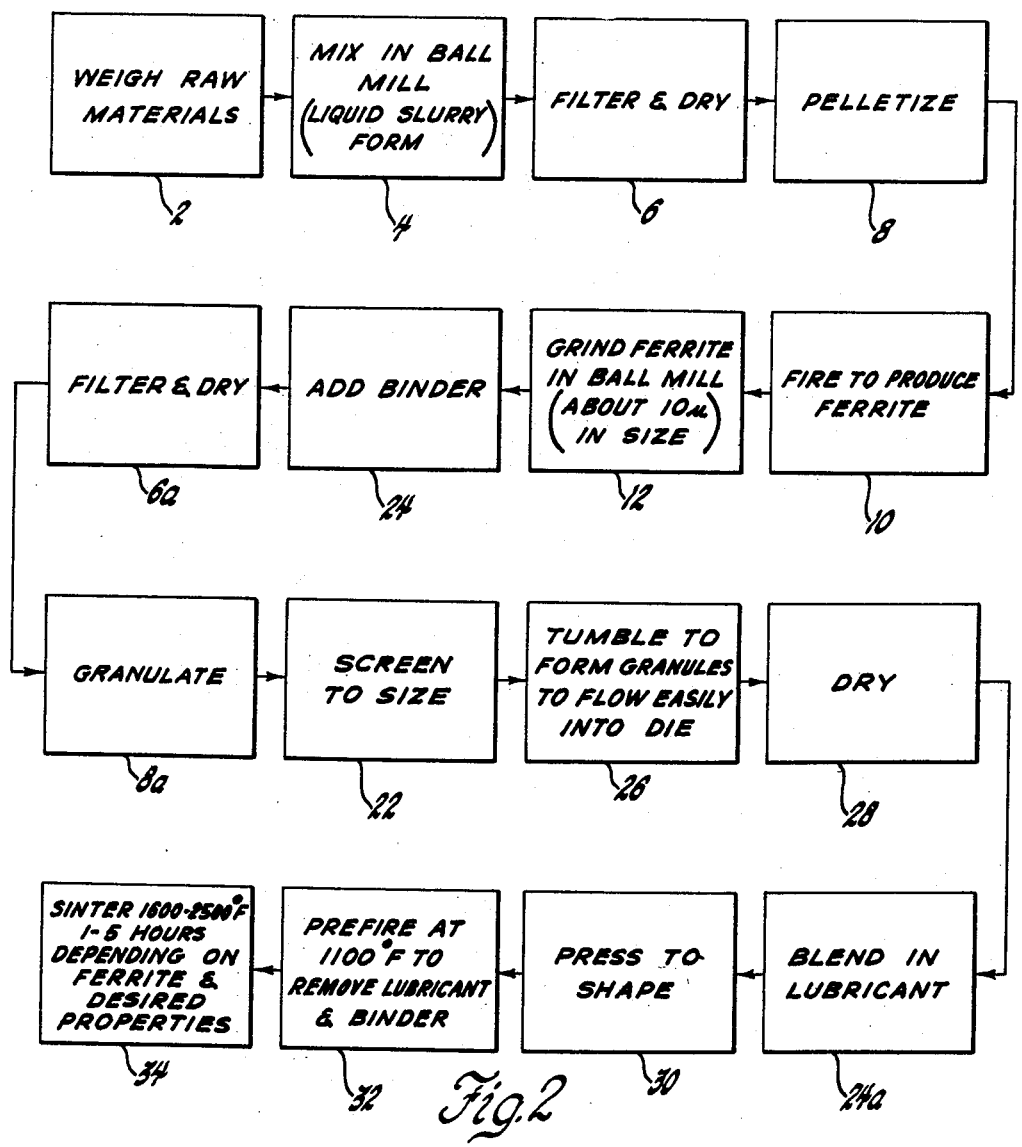
FIGURE 2 is a block diagram setting forth the various steps in a present typical method of obtaining soft and hard unoriented ferrite parts.

This method is not limited to the production of hard oriented ferrite parts. It can also be used to great advantage in making unoriented hard or soft ferrite materials. One of the current methods of producing such materials is shown diagrammatically in FIGURE 2. The steps shown in squares 2 through 12 are the same as required for hard ferrites shown in FIGURE 1 except that the ferrite particles are ground to about 10 microns in size. At this point a certain amount of binder is mixed with the material as shown in square 24. This step is quite necessary if dies are used to make the ferrite bodies. In contrast to hard ferrite formation, a soft ferrite part is pressed "dry" and the steps shown in squares 6a, 8a, 22 and 26 which are necessary to form granules are expensive and critical. After tumbling, the resultant material is finally dried and a lubricant is blended in the material as shown in square 24a. This material is ready to press to shape as shown in square 30. The pressure in the die is sufficient to cause the constituents of the part to adhere together and retain its desired shape. It is then removed from the dies and placed in a furnace as shown in square 32, where it is prefired for example at 1100° F. temperature which removes both the die lubricant and the binder, leaving only the oxides which now have to be sintered in order to convert them to ferrite crystals. After the prefiring as indicated by square 32, the part is then either transferred to another furnace for the application of a higher temperature or the temperature in the present furnace is raised to approximately 2300° F. to sinter the material and convert the same to ferrite crystals as shown in square 34.

The new method devised by me and disclosed herein for producing unoriented and soft ferrites is identical to that shown in FIGURE 1a with the exception that in square 12 the ferrite is ground until the crystal size is approximately 10 microns instead of the 1-3 microns required for the oriented ferrite and that is not necessary to roll the sheets to orient the crystals (square 38). This is a considerable reduction in complexity and time over the current method of production.

Referirng now particularly to FIGURE 3 it is desired to introduce the ferrite crystals into some temporary carrier means in sufficient density and in such a manner that they may be properly oriented or aligned and that the carrier means itself may be easily cut or shaped into desired final shapes or cores. While other methods are adaptable, one of the simplest means for accomplishing the desired result which uses existent apparatus is to use thin sheet rubber as the transfer material and to use rubber mills as a means for introducing the ferrites into the rubber transfer material and rolling it into thin sheets. As diagrammatically illustrative of this method there is shown in FIGURE 3 a section through a rubber mill having a plurality of rolls 46 and 48 driven in the opposite directions as shown by the arrows on each roll at slightly different speed. Under ordinary rubber milling procedures a continuous sheet 50 is formed on the slower roller 46 and ferrite powders fed from hoppers 52 and 54 into the excessive rubber above the rolls 56 (called the nip) will be forced into the rubber sheet. The amount of powders mixed with the rubber is easily varied to give the desired density. The mill is operated for a length of time sufficient to give the desired distribution and orientation. As the rubber is pulled into a thin sheet between the two wheels the ferrite crystals are forced into the same and in a manner to be explained are also aligned by this rolling procedure.

It is known that the hard ferrite crystals have preferential growth in the basal plane and, therefore, at the beginning of growth appear as flakes which is of importance to my method. One property of these small crystals is that they are small magnets with their NS vector normal to the crystal. This is depicted in FIGURE 5, for one highly magnified portion 60 of a sheet in which is shown a number of small ferrite crystals 58, in this case shown unoriented in vairous positions. Because of this, mechanical orientation accompanies magnetic orientation and, therefore, mechanical orientation may be used instead of the magnetic technique currently employed. If it is desired to obtain a high degree of orientation, the repeated feeding of the sheet through the roll is required. This causes the ferrite crystals to assume positions substantially parallel to the sides of the sheet. The reason why the rolling of the sheets brings these flakes into parallelism with the sides of the sheet is that there is a longitudinal force existing on one side of the sheet, as it is pulled through the rolls in excess to the longitudinal force on the opposite side. This is due to the fact that one of the rollers, 48 as shown in FIGURE 3, is driven at a slightly higher speed than roller 46, and, therefore, tends to pull on the surface of the sheet. As an example of this, FIGURE 4 shows the amounts of tangential stress across the sheet and its effect on a sample ferrite crystal at location 62 would be to apply stress of the approximate value of the arrow 64 on one side and only that amount illustrated by arrow 66 on the opposite side, which straightens the flake out so that it lies flat within the sheet. The preceding technique can be applied for orienting sheets where the maximum thickness is of the order of .010″.

Figure 6:
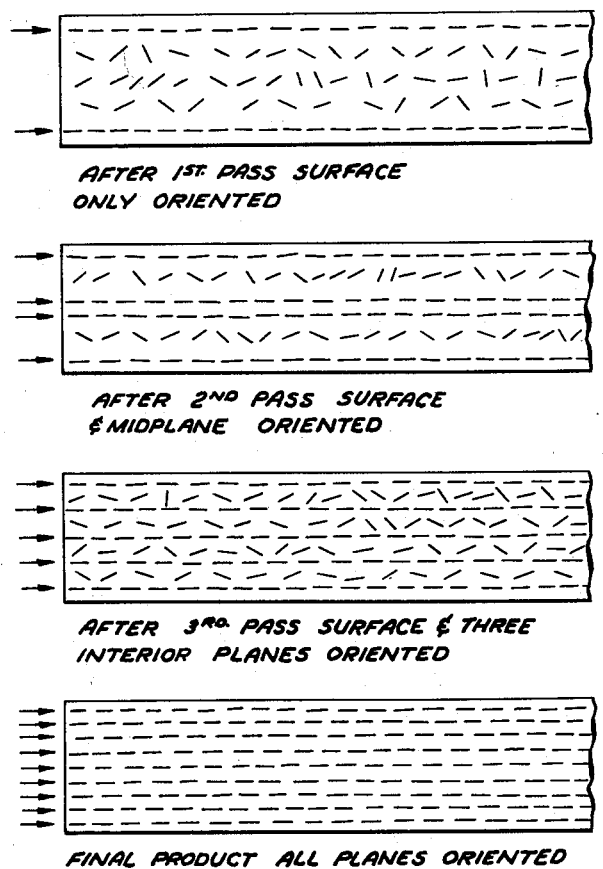
FIGURE 6 is a chart diagram illustrating the effect of repeated passes of the thicker sheets through the rolls to orient the hard ferrite crystals.

Another technique for orienting ferrite crystals in hard magnet bodies of thicker dimensions than previously described is a folding technique. This is applicable for sheets whose maximum thickness is of the order of a sixteenth of an inch. Assuming that the sheet has been passed through the rolls a few times, until those crystals in the surface thereof are aligned or oriented the interior of the sheet will appear as shown in FIGURE 6 at *a*. That is, the crystals along both surface planes will be oriented whereas those in the central portion will tend to be awry. The sheet is stripped from the rolls and then folded upon itself and run through the rolls again. If this is done two outside surfaces will come together at an interface and the result will be similar to that shown in FIGURE 6*b*. The sheet may again be folded upon itself and run through and, of course, with each attendant pass and fold additional planes will be oriented as shown in FIGURE 6*c*, until finally at 6*d* all planes within the sheet are desirably oriented.

Figure 7:
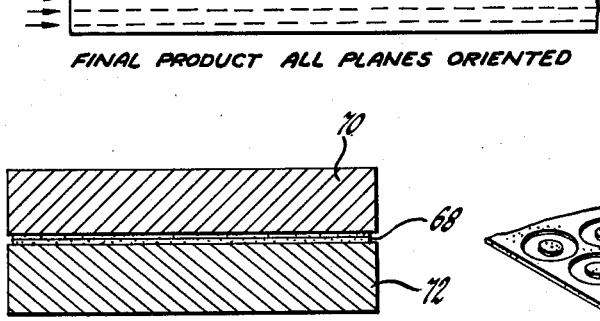
FIGURE 7 is a sectional view illustrating the building up of a thicker form for cutting into any desired shape.
Figure 8:
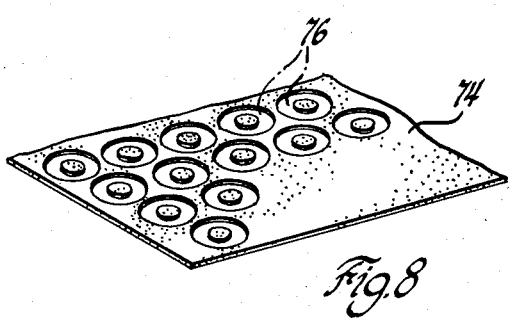
FIGURE 8 is a perspective view of a sheet of transfer material illustrating how any desired ferrite parts can be cut out of the blank; and, FIGURE 9 is an enlarged showing of a ferrite part cut from such a sheet in final form.
Figure 9:
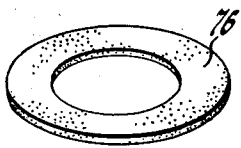

If now the final sheet still is of insufficient thickness to provide the desired blank thickness for the final part several sheets may be stacked as shown in FIGURE 7 at 68, pressed together by the platens 70 and 72. The final assembly which is still flexible and easily cut, may then be cut out with an inexpensive die such as shown in FIGURE 8, where sheet 74 has had a series of annular pieces 76 cut therefrom. These pieces such as 76, shown enlarged in FIGURE 9 are then placed into a furnace and fired where the rubber binder is burned out and the ferrite crystals remaining again sintered to form the final product of oriented ferrites.

It is to be clearly understood that by this method one does not have to depend upon pressing powdered materials into dies in order to obtain the proper form and the density throughout the whole part is uniform. No expensive dies are needed as the material is relatively soft before firing and no magnetic field of any shape is necessary to orient the crystals before firing so this method overcomes most of the objections pointed out with respect to the present methods of obtaining oriented ferrite parts and should remove a great deal of the cost in fabricating same.

This method is, of course, not limited in any way to the production of oriented or hard ferrites as it is just as useful in the preparation and fabrication of soft or unoriented ferrites. In that case, it is only necessary to be sure that sufficient density of the ferrite crystals is obtained in the rubber binder without much attention as to whether sufficient passes have been made to align the crystals, but the final sheet with its unaligned or partially aligned ferrite crystals can still be easily cut, is uniform in its density, and much easier to fabricate than by any presently known methods.

What is claimed is:

1. In a method of fabricating ferrite bodies, the steps of mixing proper proportions of basic oxides for forming ferrite crystals, firing the mixture to produce ferrite crystals, grinding the ferrite crystals to a required size, mixing the ferrite crystals with a flexible deformable organic plastic material so mixed with the ferrite crystal to a desired density, rolling said flexible deformable material into flat bulk sheets, cutting out from said bulk sheets raw parts having the configuration of the desired resultant ferrite bodies, placing the cut out raw parts in a furnace and prefiring the same to remove the flexible deformable organic plastic material and lastly elevating the temperature of the parts to sinter the ferrite crystals to complete the formation of ferrite bodies.

2. In a method of fabricating ferrite magnetic bodies, the steps of mixing proper proportions of basic oxides for forming ferrite crystals, firing the mixture to produce ferrite crystals, grinding the ferrite crystals to a a required size, mixing the ferrite crystals with a flexible deformable organic plastic material to a desired density, rolling said mixture of flexible deformable organic plastic material with embedded ferrite crystals into a flat sheet, repeatedly rolling said flat sheet of transfer material between rollers having different speeds to produce tangential stress on said sheet to align the ferrite crystals in said sheet until said ferrite crystals are aligned or oriented, cutting out raw parts of desired shapes from said sheets so produced and firing said raw parts to remove the flexible deformable organic plastic material and sinter the ferrite crystals to produce a resultant oriented ferrite body.

3. In a method of fabricating ferrite bodies, obtaining ferrite crystals having the desired magnetic characteristics, mixing said ferrite crystals with a rubber mass until the rubber mass has a desired density of crystals, mechanically manipulating the rubber mass to work it into a flat bulk form by applying pressure to opposite faces in such a manner as to produce tangential stress and tend to align the ferrite crystals in said rubber mass parallel to the surface, cutting from said flat bulk form, raw parts of desired shapes having the ferrite crystals properly oriented for their shape and intended use and firing said parts to remove the rubber mass and sinter the ferrite crystals to form a finished ferrite body.

References Cited in the file of this patent

UNITED STATES PATENTS

| | | |
|---|---|---|
| 1,789,081 | Payne | Jan. 13, 1931 |
| 2,017,705 | Sproxton | Oct. 15, 1935 |
| 2,289,713 | Land | July 14, 1942 |
| 2,348,311 | Ruben | May 9, 1944 |
| 2,694,831 | Benedict | Nov. 23, 1954 |
| 2,762,778 | Gorter et al. | Sept. 11, 1956 |
| 2,951,247 | Halpern et al. | Aug. 30, 1960 |
| 2,999,275 | Blume | Sept. 12, 1961 |

OTHER REFERENCES

Harvey et al.: Ferromagnetic Spinels etc., RCA Review, September 1950, vol. SI, No. 3, pp. 344–349.